(12) United States Patent
Duval et al.

(10) Patent No.: US 8,359,909 B2
(45) Date of Patent: Jan. 29, 2013

(54) ABNORMAL COMBUSTION DETECTION METHOD FOR INTERNAL-COMBUSTION ENGINES FROM SEVERAL COMBUSTION INDICATORS

(75) Inventors: Laurent Duval, Nanterre (FR); Alexandre Pagot, Rueil Malmaison (FR); Benoist Thirouard, Rueil Malmaison (FR); Jean-Marc Zaccardi, Rueil Malmaison (FR)

(73) Assignee: IFP Energies Nouvelles, Cedex (FR)

( * ) Notice: Subject to any disclaimer, the term of this patent is extended or adjusted under 35 U.S.C. 154(b) by 164 days.

(21) Appl. No.: 12/917,650

(22) Filed: Nov. 2, 2010

(65) Prior Publication Data

US 2011/0113869 A1  May 19, 2011

(30) Foreign Application Priority Data

Nov. 13, 2009 (FR) .................................. 09 05462

(51) Int. Cl.
  *G01M 15/08* (2006.01)
(52) U.S. Cl. ................................... 73/114.16
(58) Field of Classification Search ............... 73/114.02, 73/114.07, 114.16
  See application file for complete search history.

(56) References Cited

U.S. PATENT DOCUMENTS

| | | | |
|---|---|---|---|
| 6,688,286 B2 * | 2/2004 | Kokubo et al. | 123/406.33 |
| 7,063,071 B2 * | 6/2006 | Raichle et al. | 123/435 |
| 7,219,006 B2 * | 5/2007 | Takemura et al. | 701/111 |
| 7,246,597 B2 * | 7/2007 | Kuo et al. | 123/305 |
| 7,387,107 B2 * | 6/2008 | Kaneko et al. | 123/406.21 |
| 7,412,874 B2 * | 8/2008 | Oe et al. | 73/35.09 |
| 7,461,633 B2 * | 12/2008 | Vangraefschepe et al. | 123/434 |
| 7,669,582 B2 * | 3/2010 | Kaneko et al. | 123/406.21 |
| 7,874,200 B2 * | 1/2011 | Oe et al. | 73/35.09 |
| 8,068,972 B2 * | 11/2011 | Auclair et al. | 701/107 |
| 2002/0179053 A1 | 12/2002 | Kokubo et al. | |
| 2005/0145219 A1 | 7/2005 | Raichle et al. | |
| 2007/0016387 A1 * | 1/2007 | Takemura et al. | 702/185 |
| 2007/0084266 A1 | 4/2007 | Kaneko et al. | |
| 2007/0107692 A1 * | 5/2007 | Kuo et al. | 123/305 |
| 2008/0035129 A1 | 2/2008 | Vangraefschepe et al. | |
| 2008/0234918 A1 | 9/2008 | Kaneko et al. | |
| 2010/0077992 A1 * | 4/2010 | Auclair et al. | 123/435 |
| 2010/0094528 A1 * | 4/2010 | Auclair et al. | 701/111 |
| 2011/0118953 A1 * | 5/2011 | Duval et al. | 701/102 |

FOREIGN PATENT DOCUMENTS

| | | |
|---|---|---|
| DE | 40 15 992 A1 | 11/1991 |
| DE | 10 2004 033 072 A1 | 7/2005 |
| FR | 2 897 900 A1 | 8/2007 |
| WO | WO 2007/001064 A1 | 1/2008 |

* cited by examiner

*Primary Examiner* — Freddie Kirkland, III
(74) *Attorney, Agent, or Firm* — Antonelli, Terry, Stout & Kraus, LLP.

(57) ABSTRACT

An abnormal combustion detection method is disclosed for spark-ignition internal-combustion engines, from combustion indicators. Combustion indicators, such as CA10 and MIP, are determined which are converted to new indicators having lower dispersions than those of indicators for normal combustions that are not converted. A parameter characterizing a distribution of N values of the new combustion indicators, acquired over N cycles preceding the cycle in progress, is then determined. The start of an abnormal combustion is thereafter detected by comparing this parameter with a threshold, and the course of the abnormal combustion detected in the combustion chamber is controlled.

30 Claims, 4 Drawing Sheets

ABNORMAL COMBUSTION DETECTION METHOD FOR INTERNAL-COMBUSTION ENGINES FROM SEVERAL COMBUSTION INDICATORS

CROSS REFERENCE TO RELATED APPLICATION

Reference is made to copending U.S. Ser. No. 12/917,633, filed concurrently herewith, entitled "Abnormal Combustion Detection Method for Internal-Combustion Engines From Combustion Indicator Distribution Modeling".

BACKGROUND OF THE INVENTION

1. Field of the Invention

The present invention relates to the control of an internal-combustion engine. The present invention more particularly relates to a method for detecting an abnormal combustion of the pre-ignition type at low speed and high load, in a combustion chamber of such an engine and specifically, but not exclusively, to such a method applied to a downsized spark-ignition engine running at very high loads.

2. Description of the Prior Art

Spark-ignition engines afford the advantage of limiting local emissions (HC, CO and $NO_x$) thanks to the excellent match between the operating mode (at fuel/air ratio 1) and their simple and low-cost post-treatment system. Despite this essential advantage, these engines are badly positioned in terms of greenhouse gas emissions because Diesel engines, with which they compete, can reach 20% less $CO_2$ emissions on average.

The combination of downsizing and supercharging is one of the solutions that have become increasingly widespread for lowering the consumption of spark-ignition engines. Unfortunately, the conventional combustion mechanism in these engines can be disturbed by abnormal combustions. This type of engine includes at least one cylinder comprising a combustion chamber defined by the inner lateral wall of the cylinder, by the top of the piston that slides in the cylinder and by the cylinder head. Generally, a fuel mixture is contained in this combustion chamber and it undergoes a compression stage, then a combustion stage under the effect of a spark ignition, by a spark plug. These stages are grouped together under the term "combustion stage" in the rest of the description.

It has been observed that this fuel mixture can undergo various combustion types and that these combustion types are the source of different pressure levels, and of mechanical and/or thermal stresses some of which can seriously damage the engine.

The first combustion, referred to as conventional combustion or normal combustion, is the result of the propagation of the combustion of a fuel mixture compressed during a prior engine compression stage. This combustion normally propagates in a flame front from the spark generated at the plug and there is no risk it may damage the engine.

Another combustion type is a knocking combustion resulting from an unwanted self-ignition in the combustion chamber. Thus, after the fuel mixture compression stage, the plug is actuated so as to allow ignition of this fuel mixture. Under the effect of the pressure generated by the piston and of the heat released by the fuel mixture combustion start, a sudden and localized self-ignition of part of the compressed fuel mixture occurs before the flame front resulting from the ignition of the fuel mixture by the spark plug comes near. This mechanism, referred to as engine knock, leads to a local pressure and temperature increase and it can generate, in case it occurs repeatedly, destructive effects on the engine and mainly on the piston.

Finally, another combustion type is an abnormal combustion due to a pre-ignition of the fuel mixture before the spark plug initiates ignition of the fuel mixture present in the combustion chamber.

This abnormal combustion affects in particular engines that have undergone downsizing. This operation is intended to reduce the size and/or the capacity of the engine while keeping the same power and/or the same torque as conventional engines. Generally, this type of engine is essentially of gasoline type and it is highly supercharged.

It has been observed that this abnormal combustion occurs at high loads and generally at low engine speeds, when timing of the fuel mixture combustion cannot be optimum because of engine knock. Considering the high pressures and the high temperatures reached in the combustion chamber as a result of supercharging, an abnormal combustion start can occur, sporadically or continuously, well before ignition of the fuel mixture by the spark plug. This combustion has a first flame propagation phase that occurs too soon in relation to that of a conventional combustion. This propagation phase can be interrupted by a self-ignition involving a large part of the fuel mixture present in the combustion chamber which is much larger than in the case of engine knock.

In cases where this abnormal combustion takes place repeatedly, from engine cycle to engine cycle, it starts from a hot spot of the cylinder, for example, and is referred to as "pre-ignition". If this combustion occurs suddenly, in a random and sporadic way, it is referred to as "rumble".

The latter abnormal combustion leads to very high pressure levels (120 to 250 bars) and to a thermal transfer increase that may cause partial or total destruction of the moving elements of the engine, such as the piston or the piston rod. This pre-ignition type is currently a real limit to spark-ignition engine downsizing. It is a very complex phenomenon that can have many origins. Several hypotheses have been mentioned in the literature to explain its appearance, but so far none has been clearly validated. It appears that several of these potential causes occur simultaneously and interact with one another. This interaction, the violence of the phenomenon and its stochastic character make its analysis extremely complicated. Furthermore, all the various studies on the subject come up against the problem of proper identification of these abnormal combustions. It is in fact difficult to say if an engine is more sensitive than another to pre-ignition as long as a decision cannot be reached on the nature of each of the combustions within a given sample.

A method allowing detection and quantification of these abnormal combustions is therefore absolutely essential because it allows precise establishment of the hierarchy and identification of the tracks that will enable improvement of the design and the adjustments to the engines. This operation is particularly interesting during test bench engine developments.

Figure 1:
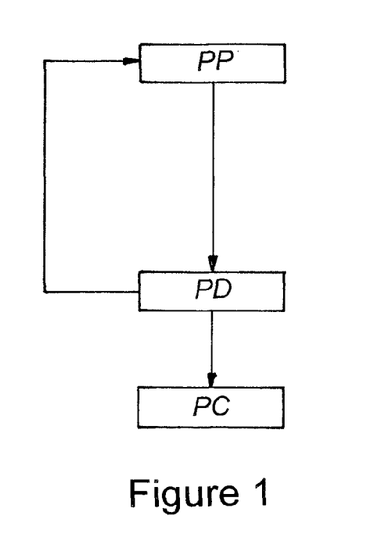
FIG. 1 shows the general methodology for dealing with abnormal combustions of the pre-ignition type.

The general methodology for dealing with these abnormal combustions is diagrammatically shown in FIG. 1, with first a prevention phase (PP) for limiting the maximum phenomenon appearance risks, then a detection phase (PD) when prevention is not sufficient to avoid the phenomenon, and determination whether it is desirable to intervene in the very cycle where pre-ignition was detected by means of a corrective phase (PC).

The detection phase comprises a signal acquisition stage, then a signal processing stage allowing detection of the appearance of pre-ignition at high load, and characterizing quantification of pre-ignition at high load.

EP Patent Application 1,828,737 describes a method for detecting the appearance of pre-ignition at high load, of the rumble type. This method is based on the measurement of a signal relative to the progression of the combustion and a comparison with a threshold signal. The presence of an abnormal combustion of the rumble type in the combustion chamber is detected when the amplitude of the signal significantly exceeds that of the threshold signal. According to this method, the threshold signal corresponds to the amplitude of the signal produced upon knocking combustion or normal (conventional) combustion.

However, according to this method, this detection does not allow action to be taken during the detection cycle proper. The corrective actions on this type of pre-ignition can only be carried out after such a phenomenon has occurred, which may seriously harm the engine integrity.

Another method is also described in French Patent 2,897,900. According to this method, action can be taken more rapidly after pre-ignition detection. Action can be taken during the same cycle as the phenomenon detection cycle. The threshold signal is therefore first calculated, that is before engine operation, then stored in data charts of the engine controller/calculator which are referred to as maps.

However, the use of engine maps does not allow detection at any time, that is in real time at the start of such a phenomenon. Detection may therefore occur too late. Furthermore, no quantification of the evolution of the phenomenon can be carried out. Thus, the necessity or not of applying a corrective phase is based only on the comparison of two amplitudes at a given time. However, such a phenomenon may also start, then stop without causing any damage to the engine, and therefore require no corrective phase.

The invention thus is an alternative method allowing detection in real time of a pre-ignition phenomenon at high load (of the rumble type), to characterize and to quantify the pre-ignition phenomena, with the devices and systems commonly used in engines, to take steps allowing prevention of the pre-ignition phenomena in the next engine operating phases and during the same cycle as the detection cycle. The method is based on a combination of several indicators which are characteristic of the state of progress of the combustion, in order to obtain other indicators allowing distinguishing more rapidly and more efficiently normal combustions from abnormal combustions such as pre-ignition.

SUMMARY OF THE INVENTION

The invention is a method for controlling the combustion of a spark-ignition internal-combustion engine, wherein an abnormal combustion is detected in a combustion chamber (14) of at least one cylinder (12) of the engine, a signal representative of a state of the combustion is recorded by using a detector in the engine. The method comprises the following stages for each engine cycle:
- deducing combustion indicators from the signal;
- converting the indicators to at least one new indicator, for which a distribution of N values acquired over N cycles preceding the cycle in progress has, for normal combustions, a lower dispersion than that of indicators which have not been converted;
- detecting the start of an abnormal combustion by comparing the new indicator with a previously determined threshold; and
- controlling the course of the abnormal combustion detected in the combustion chamber.

According to the invention, the indicators can be converted by a linear regression wherein the new indicator corresponds to a difference between a real value of the indicator which have not been converted and an indicator value estimated by linear regression. The indicators can also be converted by a principal component analysis wherein the new indicators corresponding to principal components.

The signal can be defined from at least one parameter characterizing the distribution of N values of the new indicator.

According to an embodiment, the signal is a continuous pressure measurement within the cylinder. Preferably, at least one indicator is a crank angle at which 10% of the energy introduced has been released.

The indicators can be converted by determining a new indicator that explains a variability of the indicators which have not been converted.

Finally, according to the invention, the parameter can be determined by disregarding extreme values among the N values.

BRIEF DESCRIPTION OF THE DRAWINGS

Other features and advantages of the invention will be clear from reading the description hereafter, with reference to the accompanying figures wherein.

DETAILED DESCRIPTION OF THE EMBODIMENTS

Figure 2:
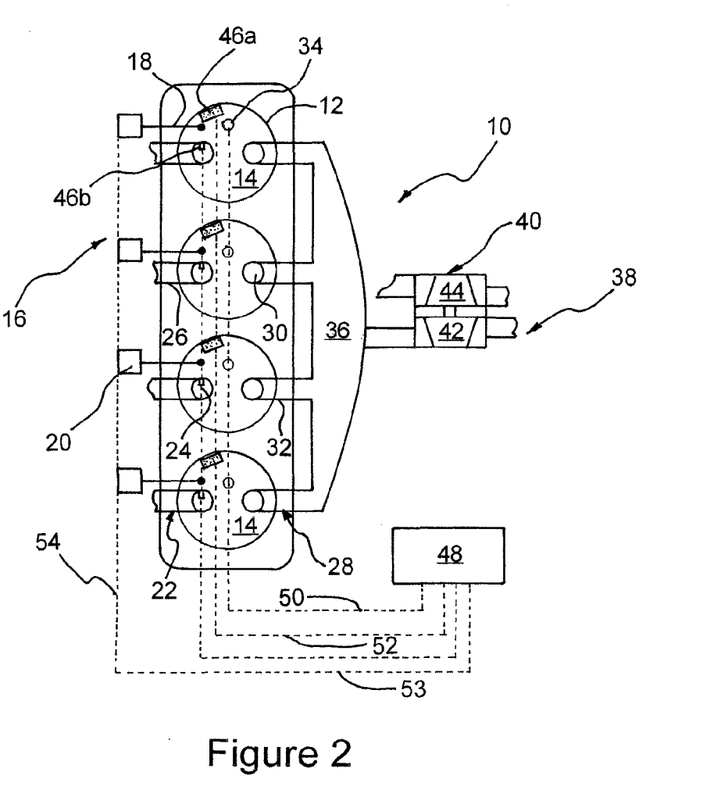
FIG. 2 shows an engine using the detection method according to the invention.

FIG. 2 shows a spark-ignition supercharged internal-combustion engine 10, in particular of gasoline type, comprising at least one cylinder 12 with a combustion chamber 14 within which combustion of a mixture of supercharged air and of fuel takes place.

The cylinder comprises at least one means 16 for delivering fuel under pressure, for example in form of a fuel injection nozzle 18 controlled by a valve 20, opening into the combustion chamber, at least one air supply means 22 with a valve 24 associated with an intake pipe 26 ended by a plenum (not shown in the figure), at least one burnt gas exhaust means 28 with a valve 30 and an exhaust pipe 32, and at least one ignition means 34, such as a spark plug, that allows generation of one or more sparks allowing the fuel mixture present in the combustion chamber to be ignited.

Pipes 32 of exhaust means 28 of this engine are connected to an exhaust manifold 36 which is connected to an exhaust line 38. A supercharging device 40, a turbocompressor for example, is located on the exhaust line. The turbocompressor comprises a drive stage 42 with a turbine scavenged by the exhaust gas circulating in the exhaust line, and a compression stage 44 having a compressor allowing intake of air under pressure which is fed into combustion chambers 14 through intake pipes 26.

The engine comprises means 46a including a sensor for measuring the cylinder pressure within cylinder 12 of the engine. The measuring means 46a generally is a pressure detector which generates a signal representative of the change of the pressure in a cylinder.

The engine can also comprise means 46b for measuring the intake pressure within plenum 26b. The measuring means 46b generally is an absolute pressure detector, of piezoelectric type, which generates a signal representative of the change of the intake pressure in the intake plenum.

The engine also comprises a computing and control unit 48 referred to as engine calculator/controller, which is connected by conductors (bidirectional for some of them) to the various elements and detectors of the engine so as to be able to receive the various signals emitted by the detectors, such as the water temperature or the oil temperature, in order to process them and then to control the components of this engine so as to ensure smooth running thereof.

Thus, in the case of the example shown in FIG. 2, spark plugs 34 are connected by conductors 50 to engine calculator 48 to control the ignition time of the fuel mixture, cylinder pressure detector 46a is connected by a line 52 to the engine calculator/controller to send thereto signals representative of the variation of the pressure in the cylinder, and valves 20 controlling injection nozzles 18 are connected by conductors 54 to calculator/controller 48 to control fuel injection in the combustion chambers. Means 46b are also connected by a line 53 to engine calculator/controller 48.

In such an engine, the method according to the invention allows detection of the appearance of a pre-ignition phenomenon at high load (of the rumble type), to characterize and to quantify the pre-ignition phenomena, using simultaneous values of several combustion indicators (CA10, MIP, . . . ).

Principally, the method of the invention combines indicators which characterize the state of progress of the combustion to obtain other indicators allowing more rapidly distinguishing and more efficient normal combustion and abnormal combustions such as pre-ignition.

Judicious selection of the indicators to be combined ($CA_{10}$, maximum cylinder pressure, maximum cylinder pressure derivative, . . . ) allows obtaining indicators referred to as "reduced indicators", denoted by $X_1, X_2, \ldots, X_n$, which exhibit, in the case of normal combustions, much lower dispersions than the direct indicators $x_1, x_2, \ldots, x_n$. It is also possible to "erase" the natural dispersion associated with combustion while keeping the same pre-ignition sensitivity.

According to an embodiment, the method of the invention comprises the following:
1—Recording at least one signal (pressure in the cylinder) representative of a state of the combustion with at least one detector in the engine, and determining from this signal, or signals, combustion indicators at each engine cycle, and then, for each cycle:
2—Providing at least one new indicator which best explains variability of the indicators, by converting the combustion indicators so that dispersions of the at least one new indicator for normal combustions are lower than dispersions of indicators which are not converted;
3—Determining at least one parameter characterizing a distribution of N values of combined combustion indicators acquired over N cycles preceding a cycle in progress;
4—Defining at least one threshold for the indicators which are converted by use of the at least one parameter characterizing the distribution; and
5—Detecting starting of an abnormal combustion by comparing combustion indicators which are converted with the threshold, and controlling a course of the abnormal combustion detected in the combustion chamber.

1—Determining a Combustion Indicator at Each Cycle

At least one signal representative of the state of the combustion is recorded by a detector in the engine. According to an embodiment, the cylinder pressure is selected. Measurement of the cylinder pressure is achieved from cylinder pressure measuring means 46a. Instrumentation of the cylinders for pressure measurement has become increasingly common in vehicles.

The invention allows use of other measurements than the cylinder pressure, such as instantaneous torque, instantaneous engine speed, vibration level (accelerometric detectors), ionization signals, . . . etc.

Then, during each cycle, combustion indicators are calculated from the at least one signal. According to an embodiment, CA10 is selected as a crank angle and the angular pressure derivative is selected when the crank angle is equal to CA10. CA10 corresponds to the crank angle where 10% of the energy which is introduced has been released.

The invention can also use other combustion indicators:
from the cylinder pressure: MIP, maximum cylinder pressure, crank angle at maximum pressure, and CAxx at maximum energy release,
from instantaneous torque: maximum torque, or a maximum torque derivative,
from the instantaneous engine speed: maximum speed, or maximum acceleration,
volume of the combustion chamber or a volume gradient at certain times (CA10 for example).

2—Constructing New Indicators Best Explaining the Variability of the Direct Indicators Judicious selection of the indicators to be combined ($CA_{10}$, maximum cylinder pressure, maximum cylinder pressure derivative, . . . ) allows obtaining indicators referred to as "reduced indicators", denoted by $X_1, X_2, \ldots, X_n$, which exhibit, in the case of normal combustions, much lower dispersions than the direct indicators $x_1, x_2, x_n$. It is also possible to "erase" the natural dispersion associated with combustion while keeping the same pre-ignition sensitivity.

A dimension reduction is thus performed (an indicator defines a dimension) so as to best exploit the relations between the various indicators.

To carry out this dimension reduction, the directions of space (x1, x2, . . . , xn) that best represent the correlations between the various quantities are sought. The hypothesis that motivates this approach is that abnormal combustions of the pre-ignition type have a combustion mode that differs in some respects from the combustion mode followed by a normal combustion. In other words, one or more characteristics of these pre-ignitions show a discontinuity allowing to distinguish them from the other normal combustions. Showing the correlations between various indicators allows readily highlighting the combustion mode changes.

According to a first embodiment, the correlations between various indicators are sought by a regression between the indicators.

Figure 3:
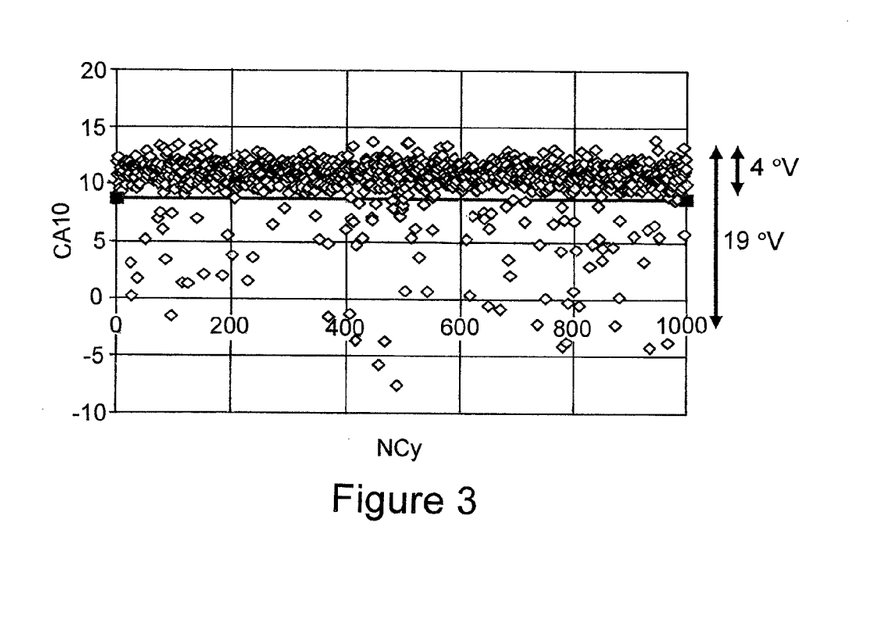
FIG. 3 is an example of evolution of the combustion initiation delay over an acquisition of 1000 cycles.

FIG. 3 shows the evolution of CA10 during an acquisition of 1000 engine cycles under stabilized running conditions. The dispersion associated with normal combustions is of the order of 4° crank angle degrees. It can also be observed that the pre-ignitions deviate from the average of the CA10 values at the maximum by about 19 crank angle degrees (19° V).

Figure 4:
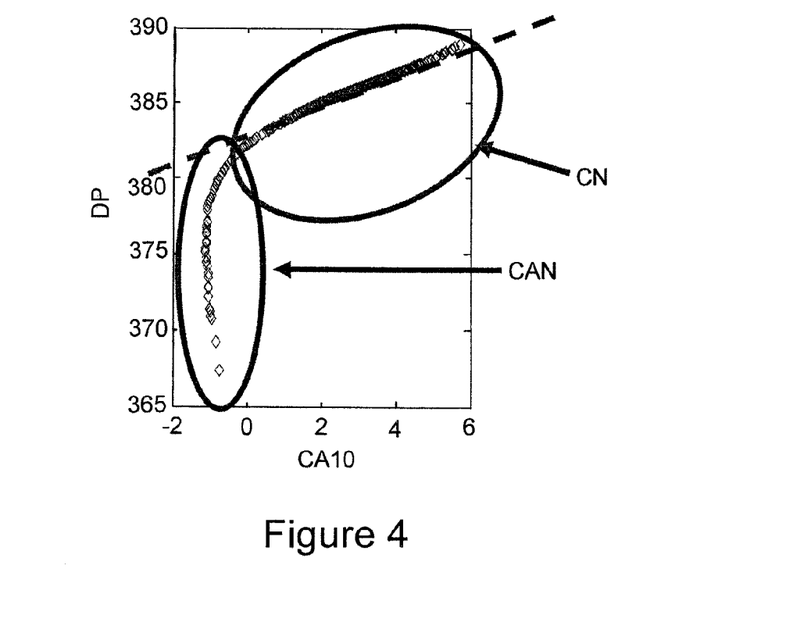
FIG. 4 illustrates the CA10 vs. angular derivative of the pressure at CA=CA10.

FIG. 4 shows the same sample of points in a CA10/DP plane, with DP being the angular pressure derivative when the crank angle is equal to angle CA10. This representation allows seeing that a linear relation connects these two variables in the case of normal combustions (CN), whereas abnormal combustions (CAN) deviate very clearly from this trend. The dotted line in FIG. 4 illustrates the line of linear regression between the two combustion indicators CA10 and DP for normal combustions (CN). Thus, these two indicators are combined to extract therefrom a third one, potentially more useful and interesting, in order to discriminate more easily abnormal combustions from normal combustions.

Figure 5:
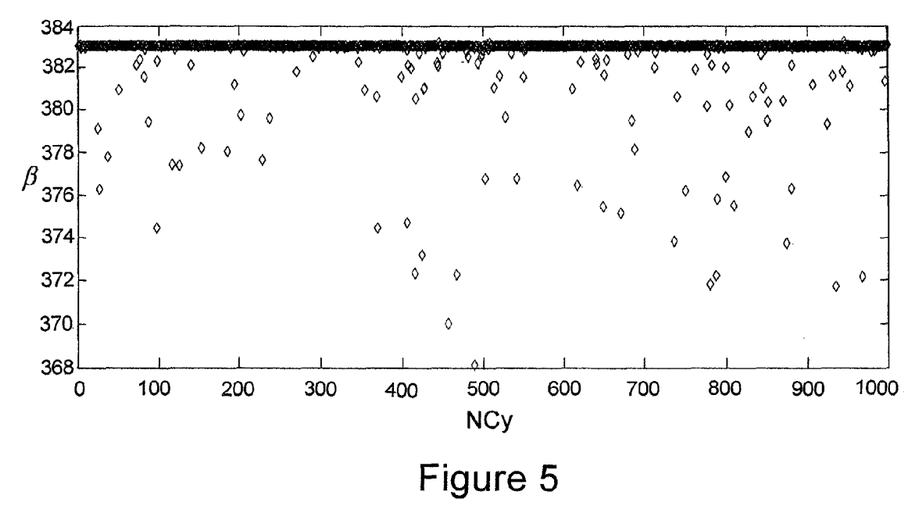
FIG. 5 illustrates the evolution of the "reduced" quantity beta over an acquisition of 1000 cycles.

It is possible for example to use as the third indicator, a converted or combined indicator, variable $\beta$ defined by the error between the regression and CA10:

$$\beta = CA10 - (\alpha \cdot DP + \gamma)$$

where $(\alpha \cdot DP + \gamma)$ is the line of linear regression between CA10 and DP for normal combustions (CN). FIG. 5 shows the evolution of the variable $\beta$ for the 1000 engine cycles (Ncy). It can be noted that the dispersion associated with normal combustions is below 0.5 crank angle degrees, whereas the pre-ignitions still remain potentially far from the average of the values of $\beta$. This variable change thus greatly tightens up the normal dispersion and is thus a more precise identification of abnormal combustions.

According to a second embodiment, the correlations between various indicators are sought by means of a principal component analysis wherein the new indicators correspond to the principal components. Correlated indicators are thus converted to new indicators which are independent of one another. These converted indicators allow a best explanation of the variability of the indicators which have not been converted.

Principal Component Analysis is a factor analysis of the multivariate data analysis family, which converts variables related to one another (correlated variables) to new variables which are independent of one another. This technique allows reduction of the information to a more limited number of components than the initial number of variables. These components allow a best explanation of the variability (variance) of the data, that is to "pick up" or obtain a maximum amount of information.

Several degrees of freedom can be used to optimize the method:
 the number of indicators used;
 the selection of the indicators to be used; and
 the reduction method used to identify the correlations between the indicators selected (PCA for example).

Figure 6:
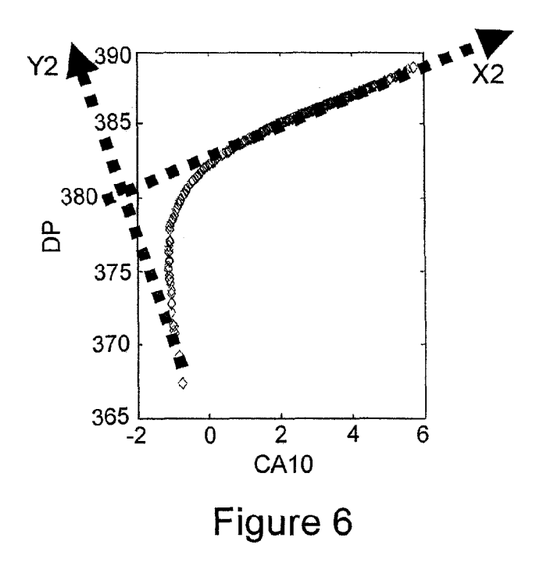
FIG. 6 illustrates the CA10 vs. angular derivative of the pressure at CA=CA10.
Figure 7:
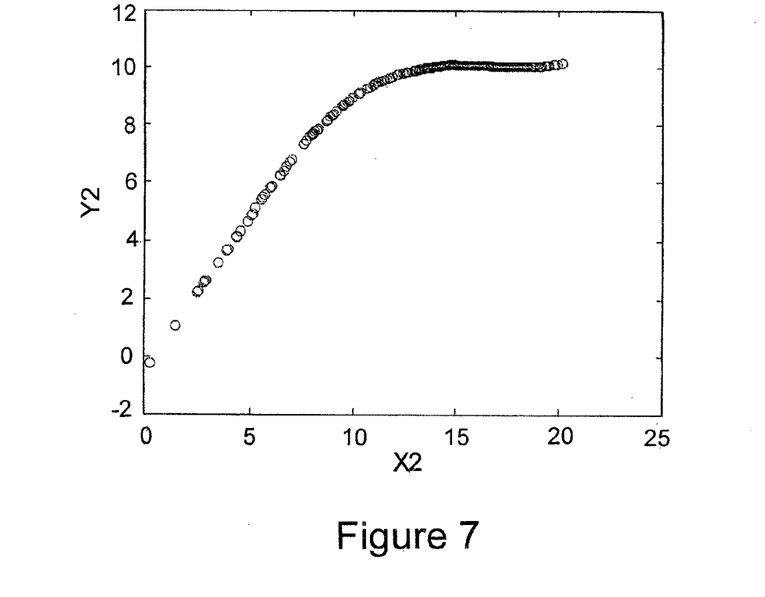
FIG. 7 illustrates Y2 as a function of X2 wherein the projection of the cycles in the reference frame obtained from the principal directions is identified in frame CA10, DP.
Figure 8:
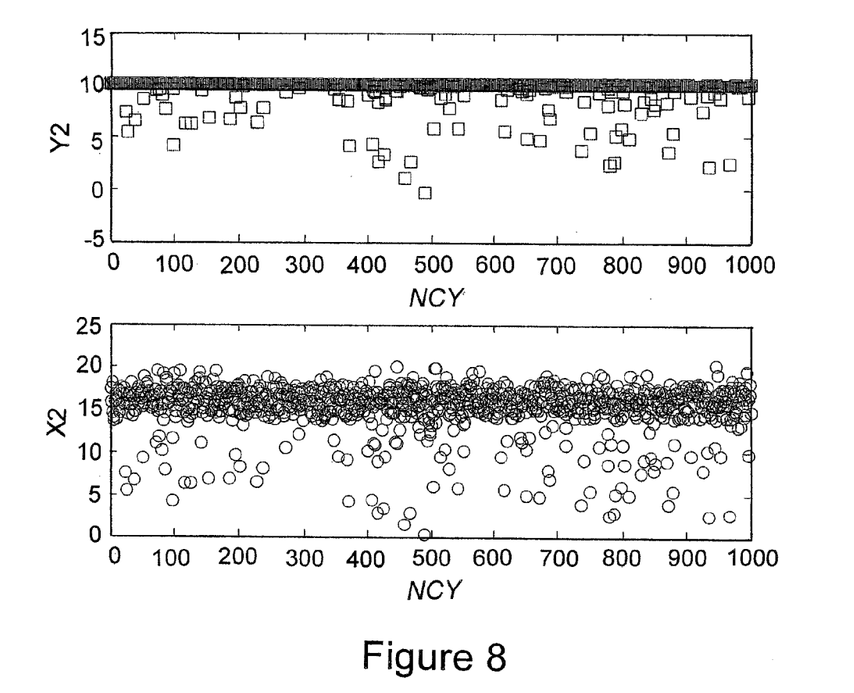
FIG. 8 illustrates Y2 (top) and X2 (bottom) for each sample.

FIGS. 6 to 8 illustrate a simple example of processing of the data acquired at an engine test bench.

A reference frame change is performed, by defining by PCA two new axes (principal components) X2 and Y2 (X2 being "carried" by the linear and dense zone of the normal combustions, X2 and Y2 being orthogonal), diagrammatically shown in FIG. 6. The representation of the same sample of points in the frame X2,Y2 is shown in FIG. 7.

The principal components (axes) are then analyzed to differentiate the pre-ignitions from the normal combustions.

3—Defining Thresholds and Detecting Combustion with Pre-Ignition

Calculating these new indicators over N cycles preceding the cycle in progress allows obtaining a distribution of N values of converted indicators, as illustrated in FIG. 5 for indicator $\beta$ and in FIG. 8 for indicators X2 and Y2.

In general terms, it is then possible to determine at least one parameter characterizing such a distribution: mean, robust mean, standard deviation, robust standard deviation, median, . . . . Advantageously, this parameter can be determined by disregarding, among N values, the extreme values.

At least one threshold is then defined for these converted indicators by means of the parameters characterizing the distribution: mean threshold, and standard deviation threshold, . . . . Advantageously, this parameter can be determined by disregarding, among the N values, the extreme values.

Within the scope of the first embodiment, where correlations between various indicators are sought by a regression between the indicators, the deviation $\beta$ between the indicator CA10 of each cycle and the linear approximation can be calculated. Consequently, in the case of normal combustions, this deviation $\beta$ is small and it increases in the case of abnormal combustions.

By defining a threshold on variable $\beta$, it can be determined very rapidly during a cycle whether the combustion is normal or not. A definition of this threshold can be readily achieved at the engine test bench.

Within the scope of the second embodiment, where correlations between various indicators are sought by a principal component analysis, the principal components are analyzed.

According to an example, component Y2 is analyzed to differentiate the pre-ignitions from abnormal combustions. The evolution of this component can be seen in FIG. 8 (top). At the bottom, the evolution of the other component, X2, is illustrated. It can be seen, as in FIG. 5, that the pre-ignitions keep the same "dynamics" in relation to normal combustions which are much denser.

On the other hand, it is much simpler and direct to define a normal combustion and pre-ignition delimitation threshold, given that the normal combustions are all very dense.

It is for example possible to use a threshold corresponding to the robust mean, from which the robust standard deviation is removed once.

4—Abnormal Combustion Control

By this comparison with a threshold, the engine calculator/controller can detect the start of an abnormal combustion of "rumble" or "pre-ignition" type in the combustion chamber.

In case of abnormal combustion, this calculator/controller then launches the actions required for control of this combustion in order to avoid the continuation of such a combustion.

What is referred to as abnormal combustion control is the possibility of controlling the progress of this combustion in order to avoid sudden destructive pressure increases, as well as the possibility of completely stopping such a combustion, through smothering for example.

The combustion control is preferably carried out by fuel re-injection at a predetermined crank angle through injection nozzles 18. More precisely, the calculator/controller controls valves 20 in such a way that the injection nozzle of the cylinder concerned allows an amount of fuel to be fed into the combustion chamber in liquid form. The amount of newly injected fuel depends on the composition of the engine and it can range between 10% and 200% of the amount of fuel initially injected into the combustion chamber. The newly injected fuel is therefore used to counter the flame that starts spreading in case of abnormal combustion. This newly injected fuel either blows out the flame or smothers it by increasing the fuel/air ratio of the fuel mixture. Furthermore, the fuel injected in liquid form uses the heat present around this flame to vaporize and the temperature conditions around the flame decrease, thus retarding combustion of the fuel mixture and notably its auto-ignition during abnormal combustion.

After this fuel injection, the pressure in the cylinder increases, but less suddenly. This pressure thereafter decreases and reaches a level compatible with the pressure level of a conventional combustion.

This mechanism prohibits any development of an abnormal combustion with a high combustion rate and high pressures. Of course, the means designed to control abnormal combustion are used in each cycle during which such a combustion is detected by the calculator/controller.

The actions of the method of the invention as described above can be combined with other, slower actions, such as throttle closure, to prevent the pressure conditions in the combustion chamber from promoting an abnormal combustion in the next cycles.

The invention claimed is:

1. A method for controlling the combustion of a spark-ignition internal-combustion engine for each engine cycle wherein an abnormal combustion is detected in a combustion chamber of at least one cylinder of the engine and a signal representative of a state of the combustion during individual cycles is recorded by a detector in the engine, comprising:
   obtaining combustion indicators from the signal;
   converting the indicators to at least one new indicator, for which a distribution of N values acquired over N cycles preceding a cycle in progress has, for normal combustions, a lower dispersion than that of indicators which are not converted;
   detecting a start of an abnormal combustion during at least one cycle by comparing the at least one new indicator with a previously determined threshold; and
   controlling a course of the abnormal combustion which is detected in the combustion chamber during cycles in which the abnormal combustion is detected.

2. A method as claimed in claim 1, wherein the indicators are converted by a linear regression wherein the at least one new indicator corresponds to a difference between a real value of indicators which are not converted and an indicator value estimated by the linear regression.

3. A method as claimed in claim 2, wherein the threshold is defined from at least one parameter which characterizes the distribution of N values of the at least one new indicator.

4. A method as claimed in claim 3, wherein the signal is a continuous pressure measurement within the at least one cylinder.

5. A method as claimed in claim 4, wherein the at least one new indicator is a crank angle at which 10% of energy introduced in the at least one cylinder has been released.

6. A method as claimed in claim 3, wherein the at least one new indicator is a crank angle at which 10% of energy introduced in the at least one cylinder has been released.

7. A method as claimed in claim 2, wherein the signal is a continuous pressure measurement within the at least one cylinder.

8. A method as claimed in claim 7, wherein the at least one new indicator is a crank angle at which 10% of energy introduced in the at least one cylinder has been released.

9. A method as claimed in claim 2, wherein the at least one new indicator is a crank angle at which 10% of energy introduced in the at least one cylinder has been released.

10. A method as claimed in claim 2, wherein the indicators are converted by determining a new indicator providing information regarding variability of the indicators which are not converted.

11. A method as claimed in claim 1, wherein the indicators are converted by a principal component analysis wherein the at least one new indicator corresponds to the principal components of the principal component analysis.

12. A method as claimed in claim 11, wherein the threshold is defined from at least one parameter which characterizes the distribution of N values of the at least one new indicator.

13. A method as claimed in claim 12, wherein the signal is a continuous pressure measurement within the at least one cylinder.

14. A method as claimed in claim 13, wherein the at least one new indicator is a crank angle at which 10% of energy introduced in the at least one cylinder has been released.

15. A method as claimed in claim 12, wherein the at least one new indicator is a crank angle at which 10% of energy introduced in the at least one cylinder has been released.

16. A method as claimed in claim 11, wherein the signal is a continuous pressure measurement within the at least one cylinder.

17. A method as claimed in claim 16, wherein the at least one new indicator is a crank angle at which 10% of energy introduced in the at least one cylinder has been released.

18. A method as claimed in claim 11, wherein the at least one new indicator is a crank angle at which 10% of energy introduced in the at least one cylinder has been released.

19. A method as claimed in claim 11, wherein the indicators are converted by determining a new indicator providing information regarding variability of the indicators which are not converted.

20. A method as claimed in claim 1, wherein the threshold is defined from at least one parameter which characterizes the distribution of N values of the at least one new indicator.

21. A method as claimed in claim 20, wherein the signal is a continuous pressure measurement within the at least one cylinder.

22. A method as claimed in claim 21, wherein the at least one new indicator is a crank angle at which 10% of energy introduced in the at least one cylinder has been released.

23. A method as claimed in claim 20, wherein the at least one new indicator is a crank angle at which 10% of energy introduced in the at least one cylinder has been released.

24. A method as claimed in claim 20, wherein the indicators are converted by determining a new indicator providing information regarding variability of the indicators which are not converted.

25. A method as claimed in claim 20, wherein the at least one parameter is determined by disregarding values among the N values.

26. A method as claimed in claim 1, wherein the signal is a continuous pressure measurement within the at least one cylinder.

27. A method as claimed in claim 26, wherein the at least one new indicator is a crank angle at which 10% of energy introduced in the at least one cylinder has been released.

28. A method as claimed in claim 1, wherein the at least one new indicator is a crank angle at which 10% of energy introduced in the at least one cylinder has been released.

29. A method as claimed in claim 28, wherein the indicators are converted by determining a new indicator providing information regarding variability of the indicators which are not converted.

30. A method as claimed in claim 1, wherein the indicators are converted by determining a new indicator providing information regarding variability of the indicators which are not converted.

* * * * *